United States Patent
Barkan et al.

(10) Patent No.: US 10,909,342 B1
(45) Date of Patent: Feb. 2, 2021

(54) BARCODE READER WITH INTELLIGENT OFF-PLATTER INDICATION SYSTEM

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/724,018

(22) Filed: Dec. 20, 2019

(51) Int. Cl.
   *G06K 7/14* (2006.01)
   *G06K 7/10* (2006.01)

(52) U.S. Cl.
   CPC ....... *G06K 7/1413* (2013.01); *G06K 7/10574* (2013.01)

(58) Field of Classification Search
   USPC .................................................. 235/462.01
   See application file for complete search history.

(56) References Cited

U.S. PATENT DOCUMENTS

| | | | |
|---|---|---|---|
| 8,430,318 B2 | 4/2013 | McQueen et al. | |
| 8,556,175 B2 | 10/2013 | McQueen et al. | |
| 8,561,902 B2 * | 10/2013 | McQueen | G01G 19/52 235/454 |
| 8,822,848 B2 | 9/2014 | Meagher | |
| 8,833,659 B2 | 9/2014 | McQueen et al. | |
| 9,064,395 B2 | 6/2015 | Shearin et al. | |
| 10,422,689 B2 | 9/2019 | Drzymala et al. | |
| 2010/0139989 A1 | 6/2010 | Atwater et al. | |
| 2011/0127333 A1 | 6/2011 | Veksland et al. | |
| 2011/0232972 A1 | 9/2011 | McQueen et al. | |
| 2013/0075168 A1 | 3/2013 | Amundsen et al. | |

\* cited by examiner

*Primary Examiner* — Rafferty D Kelly
(74) *Attorney, Agent, or Firm* — Yuri Astvatsaturov

(57) ABSTRACT

A barcode reader having lower and upper housings, a weigh platter in the lower housing, and an off-platter detection assembly. The weigh platter has a proximal edge adjacent the upper housing, a first lateral edge, and a distal edge. The off-platter detection assembly comprises an off-platter indication system having a plurality of linearly aligned light sources, each light source representing a location along the first lateral edge, and controller operatively coupled to the plurality of light sources. The controller is configured to: determine if an object extends over the first lateral edge; determine a location of the object along the first lateral edge; and illuminate a first portion of the light sources representing a distance between the proximal edge of the weigh platter and the object and de-illuminate a second portion of the light sources representing a distance between the object and the distal edge of the weigh platter.

24 Claims, 10 Drawing Sheets

BARCODE READER WITH INTELLIGENT OFF-PLATTER INDICATION SYSTEM

FIELD OF THE DISCLOSURE

The present patent relates generally to barcode readers and, in particular, to barcode readers having weigh platter assemblies and off-platter detection assemblies and indication systems.

BACKGROUND

One of the functions of a barcode reader with a weigh platter is to weigh produce or other products that are priced by weight in order to assist in determining the price of the produce or product. However, produce and products are varied in shape and size and there can be issues where part of the produce or product sits off of the weigh platter, resulting in incorrect weight measurement and, therefore, incorrect pricing. Therefore, there is a need to be able to identify when produce or products being weighed on a weigh platter of a barcode reader extend off of the weigh platter during the weighing process and to identify where the produce or product extends off the weigh platter and inform a user of the location to reduce or eliminate instances of incorrect weight measurement and pricing and allow the user to identify and correct the problem.

SUMMARY

In an embodiment, the present invention is a barcode reader configured to be supported by a workstation. The barcode reader has a housing, a weigh platter, and an off-platter detection assembly. The housing has a lower housing and an upper housing extending above the lower housing and the weigh platter is positioned within the lower housing and configured to measure a weight of an object placed on the weigh platter. The weigh platter has an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge. The off-platter detection assembly comprises an off-platter indication system having a plurality of linearly aligned light sources, each of the plurality of light sources representing a location along the first lateral edge of the weigh platter, and controller operatively coupled to the plurality of light sources. The controller is configured to: determine if an object extends over the first lateral edge of the weigh platter; determine a location of the object along the first lateral edge if determined that the object extends over the first lateral edge; and illuminate a first portion of the plurality of light sources representing a distance between the proximal edge of the weigh platter and the determined location of the object and de-illuminate a second portion of the plurality of light sources representing a distance between the determined location of the object and the distal edge of the weigh platter if determined that the object extends over the first lateral edge.

In another embodiment, the present invention is a barcode reader configured to be supported by a workstation. The barcode reader has a housing, a weigh platter, and an off-platter detection assembly. The housing has a lower housing and an upper housing extending above the lower housing and the weigh platter is positioned within the lower housing and configured to measure a weight of an object placed on the weigh platter. The weigh platter has an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge. The off-platter detection assembly has an overhead imaging assembly, an off-platter indication system having a visual display, and a controller in communication with the overhead imaging assembly and the off-platter indication system. The overhead imaging assembly is positioned above the weigh platter and includes an imager having a field-of-view extending downward towards the upper surface of the weigh platter and having a central axis that extends perpendicular to the upper surface. The imager is configured to capture an image of the upper surface of the weigh platter with an object positioned on the weigh platter, including the first lateral edge, the second lateral edge, and the distal edge within the field-of-view. The controller is configured to: identify and locate the first and second lateral edges based upon a training image of the upper surface of the weigh platter within the field-of-view, the training image comprising an image of the weigh platter without an object and the first and second lateral edges within the field-of-view; receive the image from the imager; determine if the object extends over the first and/or second lateral edges based on the image; determine a location where the object extends over the first and/or second lateral edges if determined that the object extends over the first and/or second lateral edges; and display a platter representation with an indication of the location where the object extends over the first and/or second lateral edges displayed in the platter representation on the visual display in response to the controller determining that the object does extend over the first and/or second lateral edges based on the image.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
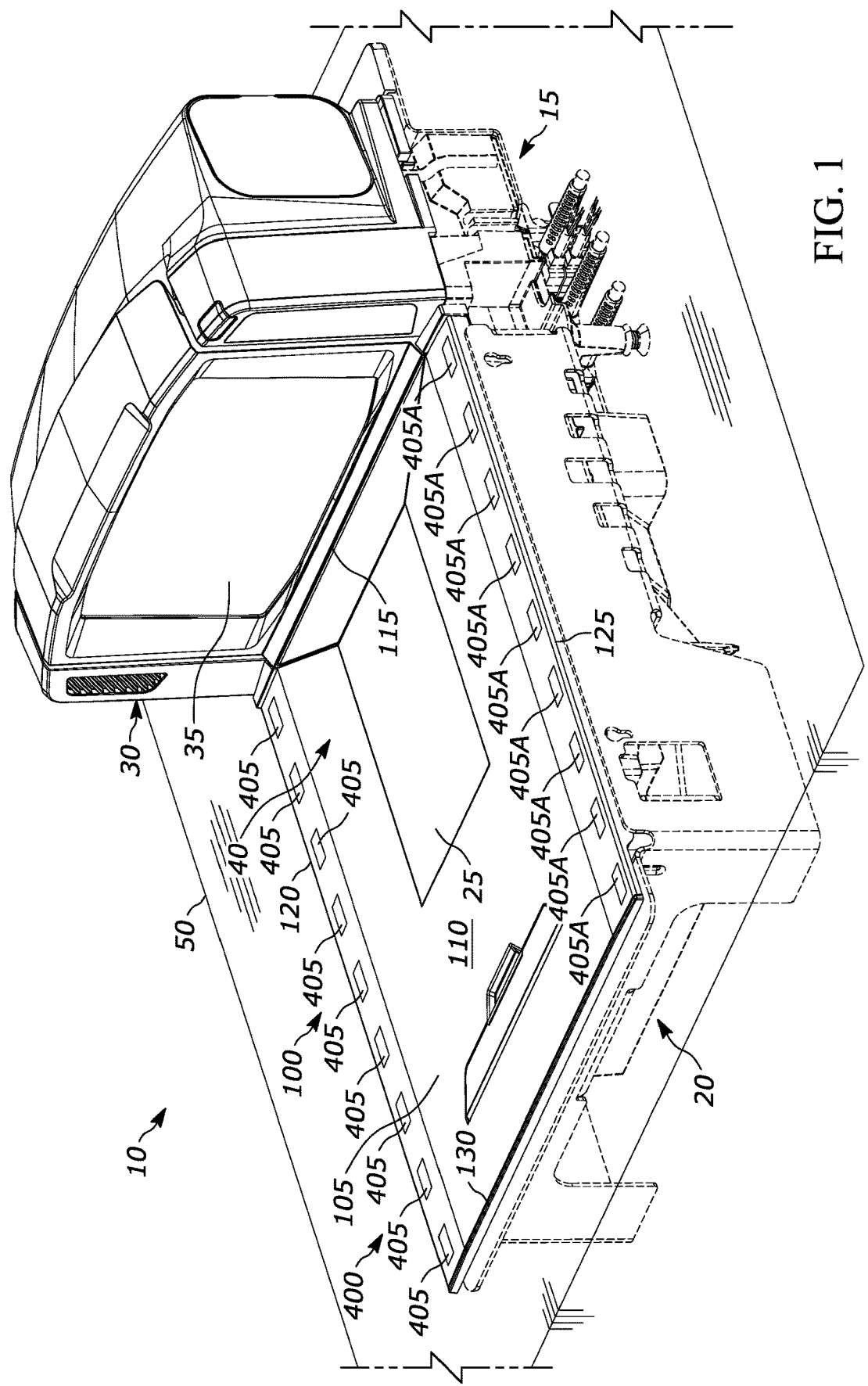
FIG. 1 illustrates a front perspective view of a first example barcode reader having an off-platter detection assembly with a first example off-platter indication system.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to barcode readers having off-platter indication systems that can be used with off-platter detection assemblies. In addition to simply providing a user with an alert that there may be an off-platter event, the off-platter indication systems herein provide a user with an indication of the location of the off-platter event, which allows the user to quickly and easily identify and correct the potential off-platter event. The off-platter indication systems herein can be used with various types of off-platter detection systems, such as infrared (IR) systems, light detection and ranging (LIDAR) systems, camera based systems, beam breaking systems, light only systems, etc., to indicate to the user whether the potential off-platter event is on a left side, right side, or end of the weigh platter and where along the indicated side the off-platter event is occurring.

Figure 2:
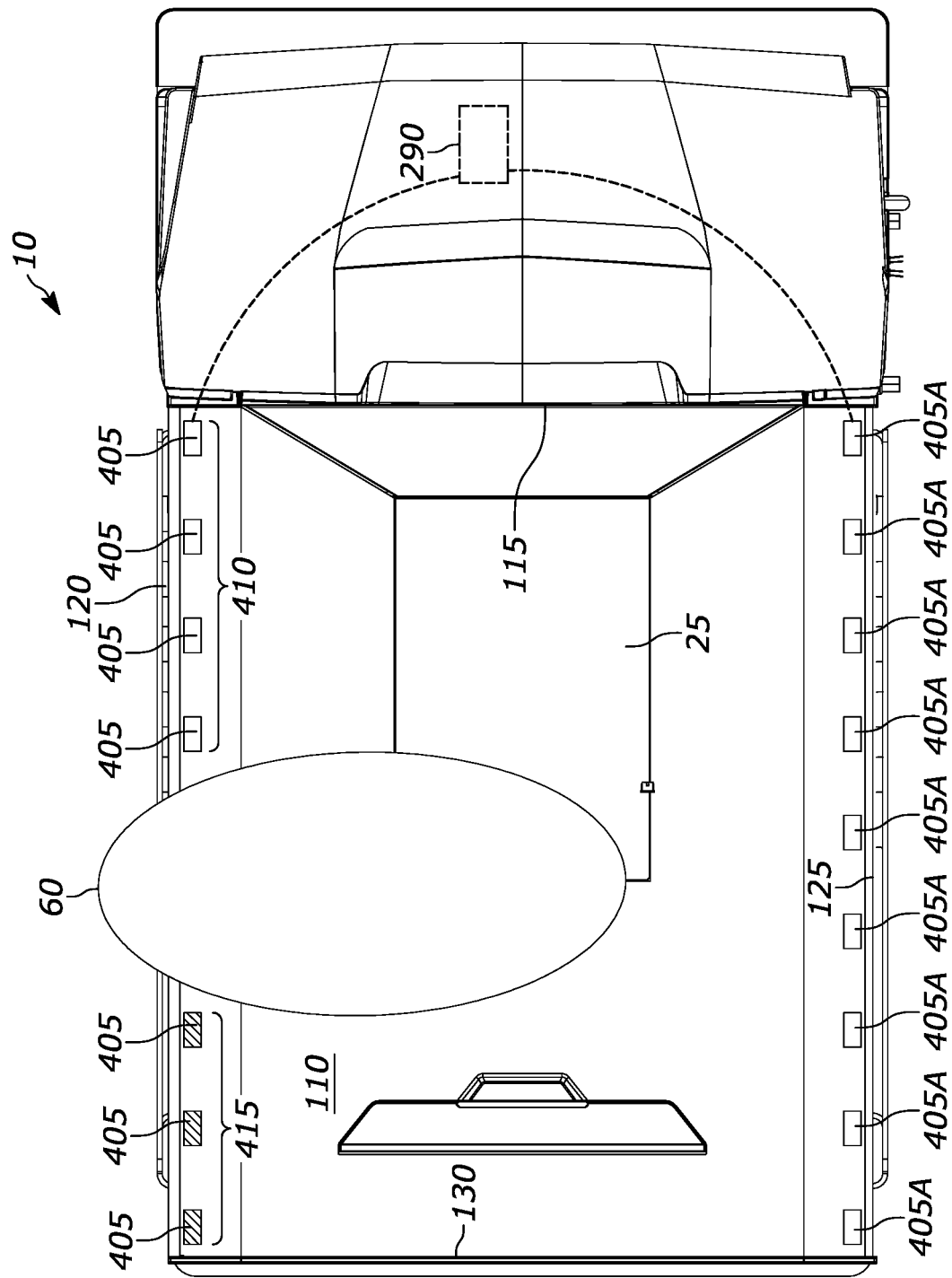
FIG. 2 illustrates a top view of the barcode reader of FIG. 1 with an object extending across a first lateral edge of the weigh platter.

Referring to FIG. 1-2, an first example barcode reader 10, such as the Zebra® MP7000 bioptic barcode reader, is shown and can be configured to be supported by a workstation 50, such as a checkout counter at a POS of a retail store. Barcode reader 10 has a housing 15 that includes a lower housing 20 that houses a weigh platter assembly 100 and an upper housing 30 that extends above lower housing 20. Upper housing 30 includes a generally vertical window 35 to allow a first set of optical components positioned within housing 15 to direct a first field-of-view through vertical window 35. In addition, if barcode reader 10 is a bioptic barcode reader, lower housing 20 will include a generally horizontal window 25, which in the example shown is positioned in a weigh platter 105 of weigh platter assembly 100 to allow a second set of optical components positioned within housing 15 to direct a second field of view through horizontal window 25. The first and second fields of view intersect to define a product scanning region 40 of barcode reader 10 where a product can be scanned for sale at the POS.

Weigh platter assembly 100 generally includes a weigh platter 105 that is positioned within lower housing 20 and is configured to measure the weight of an object placed on weigh platter 105. Weigh platter 105 has upper surface 110 that faces product scanning region 40, a proximal edge 115, a first lateral edge 120, a second lateral edge 125, and a distal edge 130. In the example shown, proximal edge 115 is adjacent upper housing 30 and would be the edge furthest from a user of weigh platter assembly 100 and/or barcode reader 10. First lateral edge 120 extends non-parallel to proximal edge 115. Second lateral edge 125 is opposite first lateral edge 120 and extends non-parallel to proximal edge 115. Distal edge 130 is opposite proximal edge 115, would be the edge closest to the user, and extends non-parallel to first and second lateral edges 120, 125. In the example shown, weigh platter is generally rectangular and first and second lateral edges 120, 125 are parallel and perpendicular to proximal edge 115 and distal edge 130 and distal edge is parallel to proximal edge 115.

The barcode reader 10 in FIGS. 1-2 also includes an off-platter detection assembly with a first example off-platter indication system 200, which has a plurality of linearly aligned light sources 405 that each represent a location along first lateral edge 120 of weigh platter 105. In the example shown, light sources 405 can be any type of light source, such as light emitting diodes, and are positioned in upper surface 110 of weigh platter 105 and generally aligned along first lateral edge 120. In the example shown, light sources 405 are spread out along the entire length of weigh platter 105, however, light sources 405 can also be grouped closely together and positioned adjacent distal edge 130 of weigh platter 105 so that light sources 405 are easily viewable by a user and the chance that an object being weighed would obscure light sources 405 from the view of the user would be reduced. For simplicity, only light sources 405 along first lateral edge 120 are described herein, however, it will be understood that off-platter indication system 400 can also include a second plurality of linearly aligned light sources 405A along second lateral edge 125 to provide an indication of a potential off-platter event and the location of the potential off-platter event along second lateral edge 125. The off-platter detection assembly also has a controller 290 that is configured to determine if an object 60 (FIG. 2) extends over first lateral edge 120 of weigh platter 105 and, if so, determine the location of object 60 along first lateral edge 120, as described in more detail below. If controller 290 determines that object 60 extends over first lateral edge 120, controller 290, which is operatively coupled to light sources 405, is configured to illuminate a first portion 410 of light sources 405 located between object 60 and proximal edge 115 of weigh platter 105 to represent the distance between proximal edge 115 and the location that object 60 crosses first lateral edge 120 and to de-illuminate a second portion 415 of light sources 405 located between object 60 and distal edge 130 of weigh platter 105 to represent the distance between the location that object 60 crosses first lateral edge 120 and distal edge 130. The de-illumination of second portion 415 of light sources 405 alerts the user that there is a potential off-platter event along first lateral edge 120 and the illumination of the first portion 410 of light sources 405 identifies to the user the location of the potential off platter event. In addition, off-platter indication system can have a speaker or other audio device that can also provide audio notifications informing the user where the potential off-platter event is occurring (e.g., left side, right side, left side near upper housing, right side near end of platter, etc.).

Figure 3:
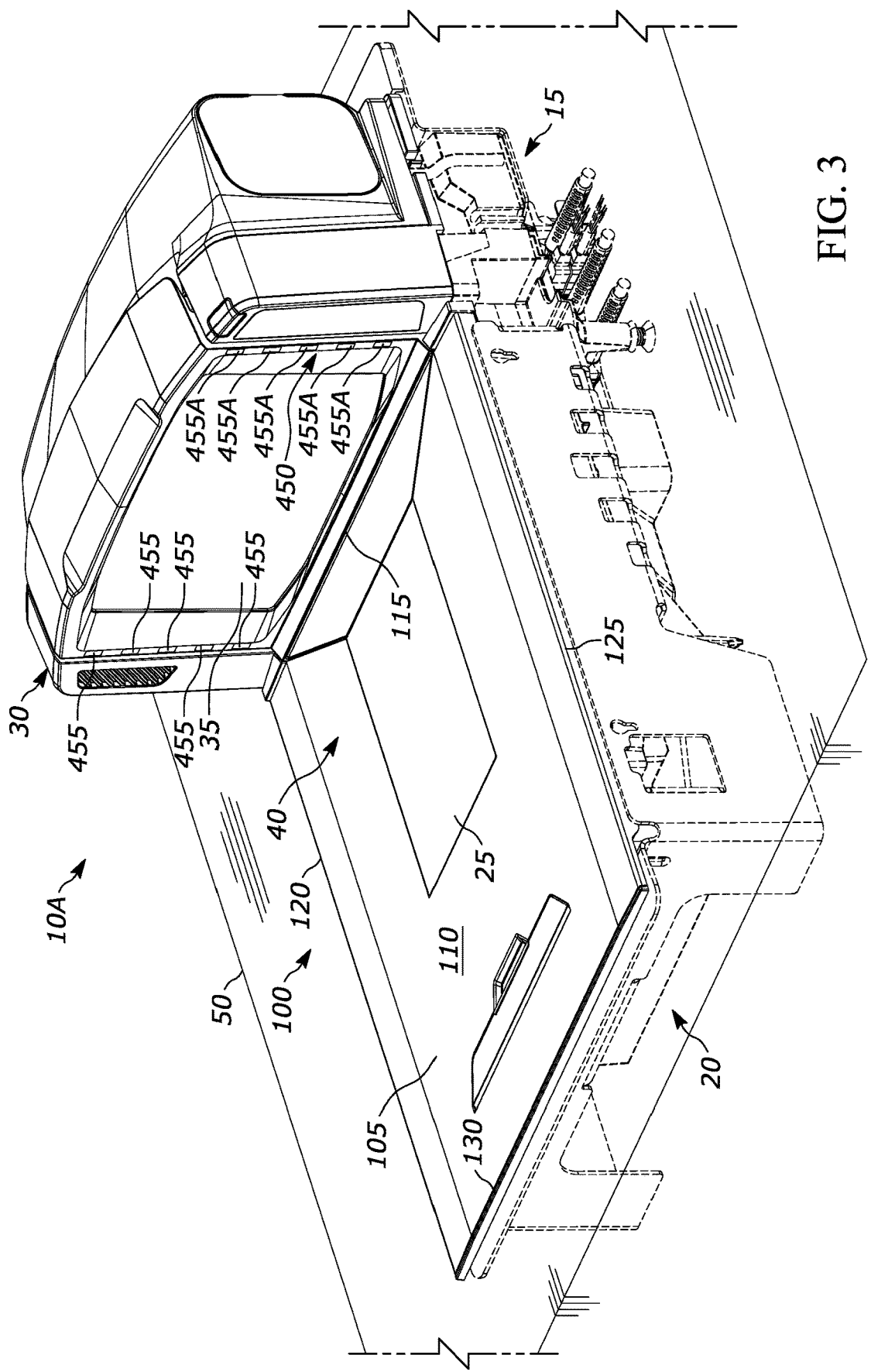
FIG. 3 illustrates a front perspective view of a second example barcode reader having an off-platter detection assembly with a second example off-platter indication system.
Figure 4:
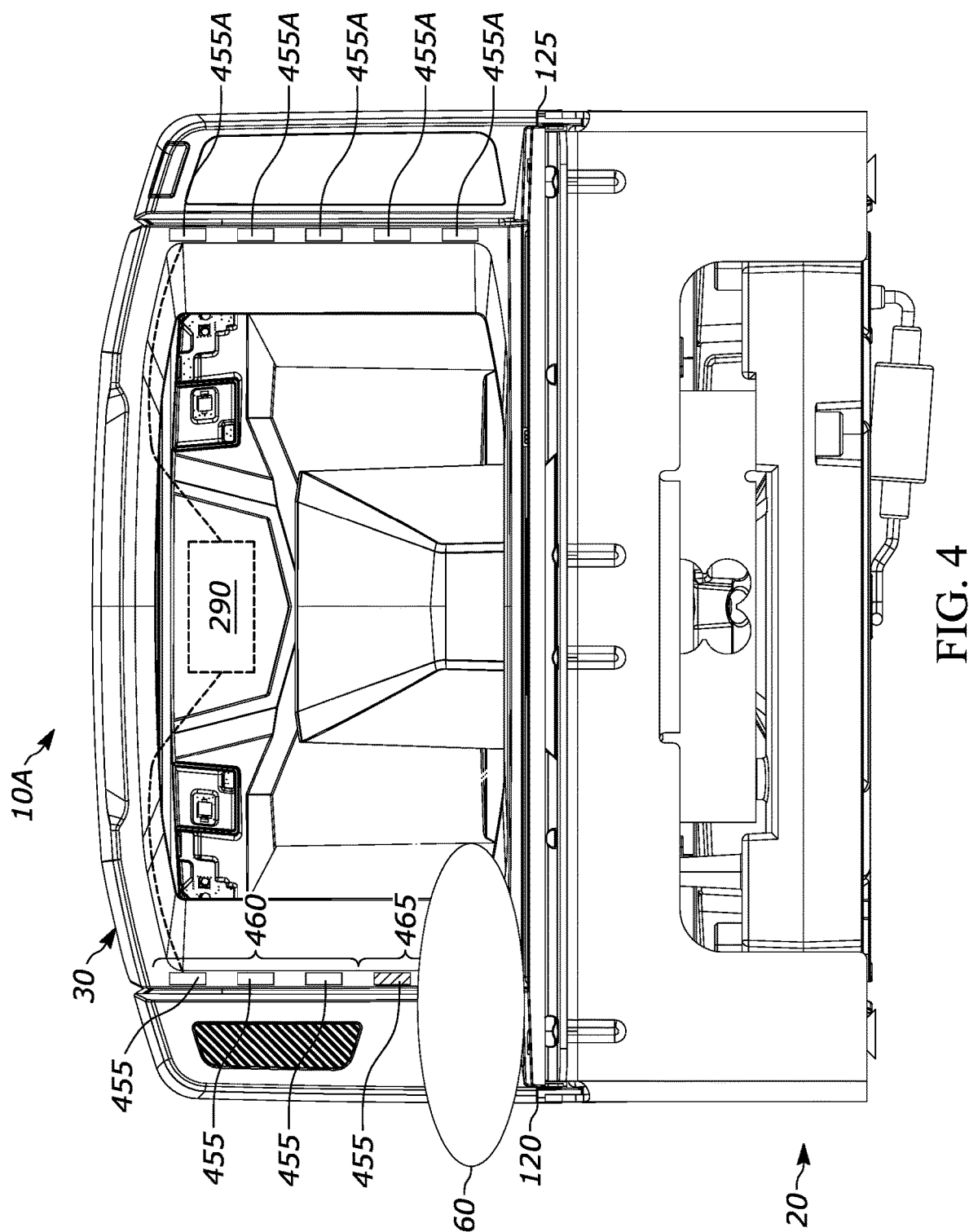
FIG. 4 illustrates a front view of the barcode reader of FIG. 3 with an object extending across a first lateral edge of the weigh platter.

Referring to FIGS. 3-4, a second example barcode reader 10A is illustrated that is the same as barcode reader 10, but includes an off-platter detection assembly with a second example off-platter indication system 450, rather than off-platter indication system 400. Off-platter indication system 450 is similar to off-platter indication system 400 in that off-platter indication system 450 has a plurality of linearly aligned light sources 455 that each represent a location along first lateral edge 120 of weigh platter 105. In the example shown, light sources 405 can be any type of light source, such as light emitting diodes, and are positioned in upper housing 30 and are generally aligned with first lateral edge 120 of weigh platter 105 and directed towards distal edge 130 so they are visible by a user. In the example shown, light sources 455 are spread out along the entire height of upper housing 30, however, light sources 455 can also be grouped closely together and positioned adjacent the top of upper housing 30 so that light sources 455 are easily viewable by a user and the chance that a tall object being weighed would obscure light sources 455 from the view of the user would be reduced. Again, for simplicity, only light sources 455 aligned with first lateral edge 120 are described herein, however, it will be understood that off-platter indication system 450 can also include a second set of light sources 455A aligned with second lateral edge 125 to provide an indication of a potential off-platter event and the location of the potential off-platter event along second lateral edge 125. The off-platter detection assembly also has a controller 350 that is configured to determine if an object 60 (FIG. 4) extends over first lateral edge 120 of weigh platter 105 and, if so, determine the location of object 60 along first lateral edge 120, as described in more detail below. If controller 350 determines that object 60 extends over first lateral edge 120, controller 350, which is operatively coupled to light sources 455, is configured to illuminate a first portion 460 of light sources 455 to represent the distance between proximal edge 115 and the location that object 60 crosses first lateral edge 120 and to de-illuminate a second portion 465 of light sources 455 to represent the distance between the location that object 60 crosses first lateral edge 120 and distal edge 130. The de-illumination of second portion 465 of light sources 455 alerts the user that there is a potential off-platter event along first lateral edge 120 and the illumination of the first portion 460 of light sources 455 identifies to the user the location of the potential off platter event.

Figure 5:
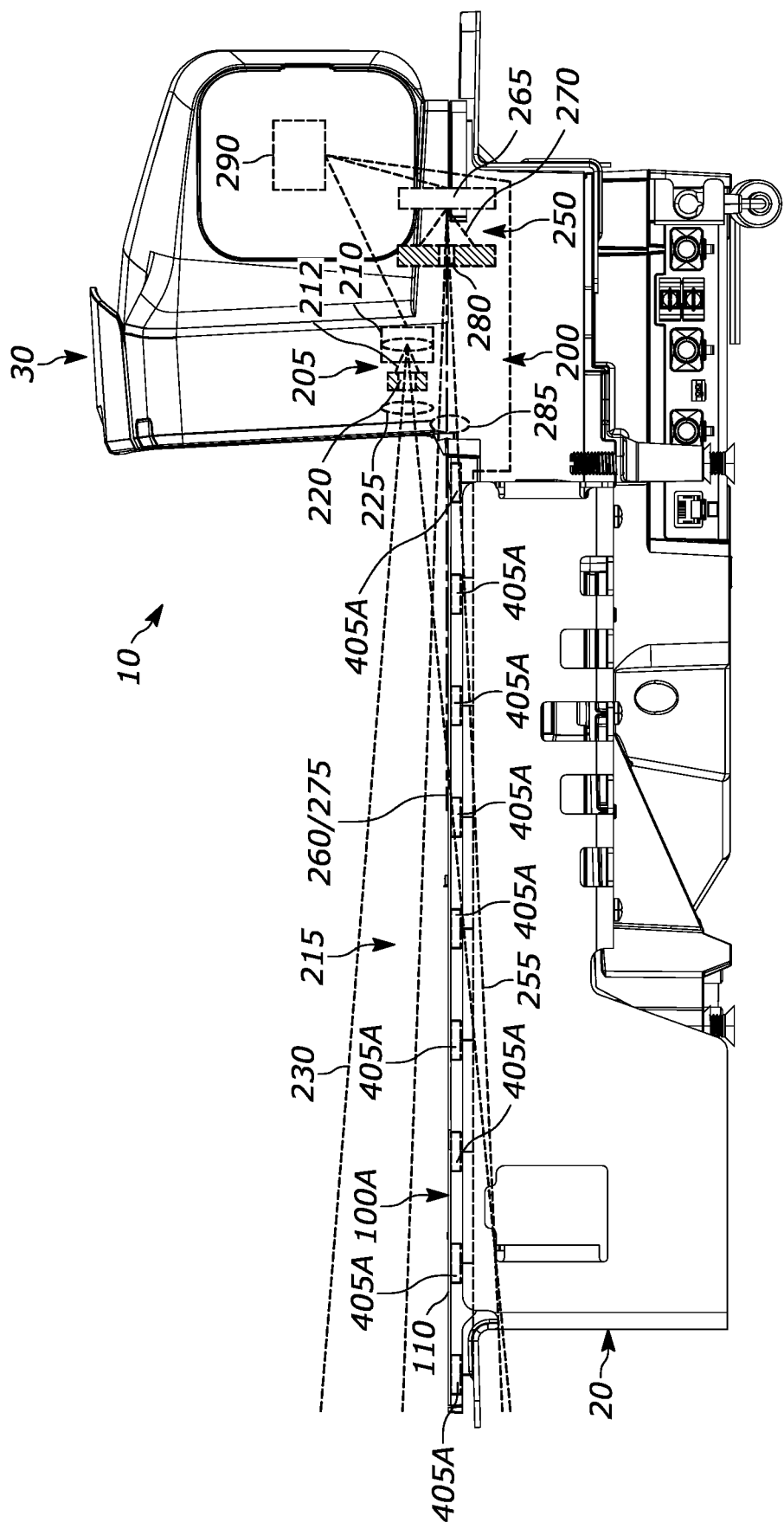
FIG. 5 illustrates a side view of the barcode reader of FIG. 1 with one example off-platter detection assembly.
Figure 6:
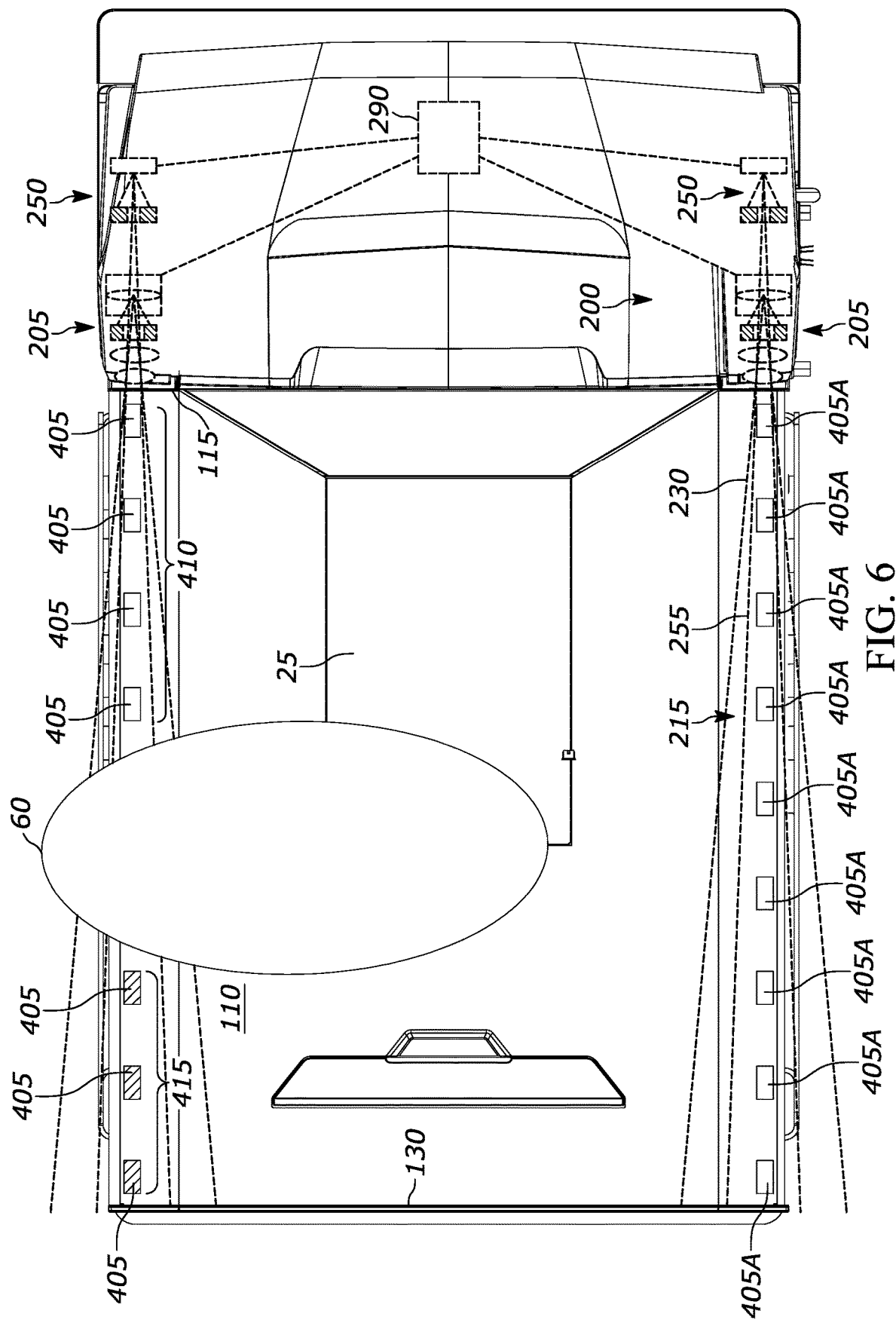
FIG. 6 illustrates a top view of the barcode reader of FIG. 5 with an object extending across a first lateral edge of the weigh platter.

FIGS. 5-6 illustrate barcode reader 10 with off-platter indication system 400 and one particular example of an off-platter detection assembly 200, which in the example shown is a LIDAR based system. The example off-platter detection assembly 200 generally includes a light emission assembly 205, a light detection assembly 250, and controller 290 operatively coupled to light emission assembly 205 and light detection assembly 250. For simplicity, only a single light emission assembly 205 and light detection assembly 250 along first lateral edge 120 are described herein, however, it will be understood that off-platter detection assembly 200 can also include a second light emission assembly and a second light detection assembly on an opposite side to detect objects that extend over second lateral edge 125, as shown in FIG. 6.

Light emission assembly 205 can be located within upper housing 30 of housing 15, has a light source 210, and is configured to emit pulses of light 215 away from proximal edge 115, towards distal edge 130, and along first lateral edge 120 of weigh platter 105. Light source 210 could be an LED that is focused into a narrow beam, similar to an aiming dot used in scanners, a focused laser beam, etc., and could be on the infrared wavelength, visible light wavelength, or any wavelength desired. Light source 210 can have a field-of-view 212 and light emission assembly 205 can also include an aperture 220, which could be formed in a wall or protrusion of housing 15 or could be formed through another wall or structure that is part of weigh platter assembly 100, positioned in front of light source 210 to constrain field-of-view 212 of light source 210 into a narrow field-of-view 230 along first lateral edge 120. A lens 225 can also be positioned in front of aperture 220 and configured to focus the one or more pluses of light 215. In addition, although off-platter detection assembly 200 does not require any bumps or physical barriers at distal edge 130 of weigh platter 105, if desired, a barrier can be positioned at distal edge 130, opposite light emission assembly 205, and can be made of a material and/or color that is absorptive to the wavelength of the pulses of light 215 to prevent reflection of the pulses of light 215 from objects or users that are beyond distal edge 130.

Light detection assembly 250 can also be located within housing 15 and has a field-of-view 255, with a central field-of-view axis 260 that is substantially adjacent to and parallel relative to first lateral edge 120, that extends from proximal edge 115 to at least distal edge 130 and along first lateral edge 120. Light detection assembly 250 has a light sensor 265 that is configured to detect at least a portion of the pulses of light 215 that are reflected from an object 60 that extends across the path of the pulses of light 215, and therefore off weigh platter 105, towards proximal edge 115 and within field-of-view 255. To restrict field-of-view 255, light sensor 265 can be set deep within housing 15 or the path of field-of-view 255 can be folded with reflectors or prisms to locate light sensor 265 wherever needed inside housing 15. The deep inset of light sensor 265 helps light sensor 265 remain immune to other outside light sources. Light sensor 265 can have a second field-of-view 270 that is larger than field-of-view 255 of light detection assembly 250 and an aperture 280, which could be formed in a wall or protrusion of housing 15 or could be formed through another wall or structure that is part of weigh platter assembly 100, can be positioned in front of light sensor 265 to constrain field-of-view 270 of light sensor 265, where a center of aperture 280 is coaxial with a central field-of-view axis 275 of field-of-view 270 of light sensor 265. In addition, a lens 285 can also be positioned in front of aperture 280 and configured to focus the reflected portion of the pulses of light 215 onto light sensor 265. For example, aperture 280 can be 1 millimeter or smaller and be positioned 3 inches back from lens 285, which will provide a magnification of approximately 400% at distal edge 130 of weigh platter 105.

In addition to controlling the illumination and de-illumination of light sources 405, controller 290 is also configured to measure a time-of-flight of a pulse of light reflected from an object 60 (FIG. 6). The time-of-flight is the time elapsed from when the pulse of light is emitted by light emission assembly 205 to when at least a portion of the pulse of light is reflected back to light detection assembly 250 and detected by light sensor 265. Controller 290 can also be configured to determine if object 60 extends across first lateral edge 120 and off of weigh platter 105 by determining if the time-of-flight of the reflected portion of the pulse of light is equal to or greater than a predetermined time-of-flight, which is the predetermined time elapsed from when a light pulse is emitted by light emission assembly 205 to when at least a portion of the pulse of light is reflected back to light detection assembly 250 from an object that located at distal edge 130 of weigh platter 105 and detected by light sensor 265. If a measured time-of-flight is equal to or greater than the predetermined time-of-flight, or if a pulse of light is not reflected back to light detection assembly 250, this indicates that there is no object extending across first lateral edge 120 between proximal edge 115 and distal edge 130 and controller 290 can be configured to allow the measure weight of the object to be recorded. If the measured time-of-flight is less than the predetermined time-of-flight this indicates that object 60 is extending across first lateral edge 120 between proximal edge 115 and distal edge 130 and, in addition to illuminating and de-illuminating light sources 405 as described above, controller 290 can also be configured to prevent the measured weight of object 60 from being recorded. Controller 290 can also be configured to determine the location of object 60 along first lateral edge 120 based on the time-of-flight. The shorter the time-of-flight, the closer object 60 is to light sensor 265 and, therefore, to proximal edge 115. The longer the time-of-flight, the further object 60 is from light sensor 265 and, therefore, from proximal edge 115.

In operation, light emission assembly 205 of off-platter detection assembly 200 emits pulses of light 215 from light source 210 along first lateral edge 120 of weigh platter 105. Light detection assembly 250 has field-of-view 255 along first lateral edge 120. When an object 60 extends across the path of the pluses of light 215, and therefore off weigh platter 105, a portion of the pulses of light 215 are reflected from object 60 and towards light sensor 265 and light sensor 265 detects the portion of the pulses of light 215 reflected from object 60. Controller 290 receives a signal from light sensor 265 indicating that reflected light from object 60 has been detected and either a time the reflected light was detected. Depending on the time-of-flight, controller 290 then determines if object 60 extends across first lateral edge 120 and off weigh platter 105 and, if so, the location that object 60 extends across first lateral edge 120, as discussed above.

Figure 7:
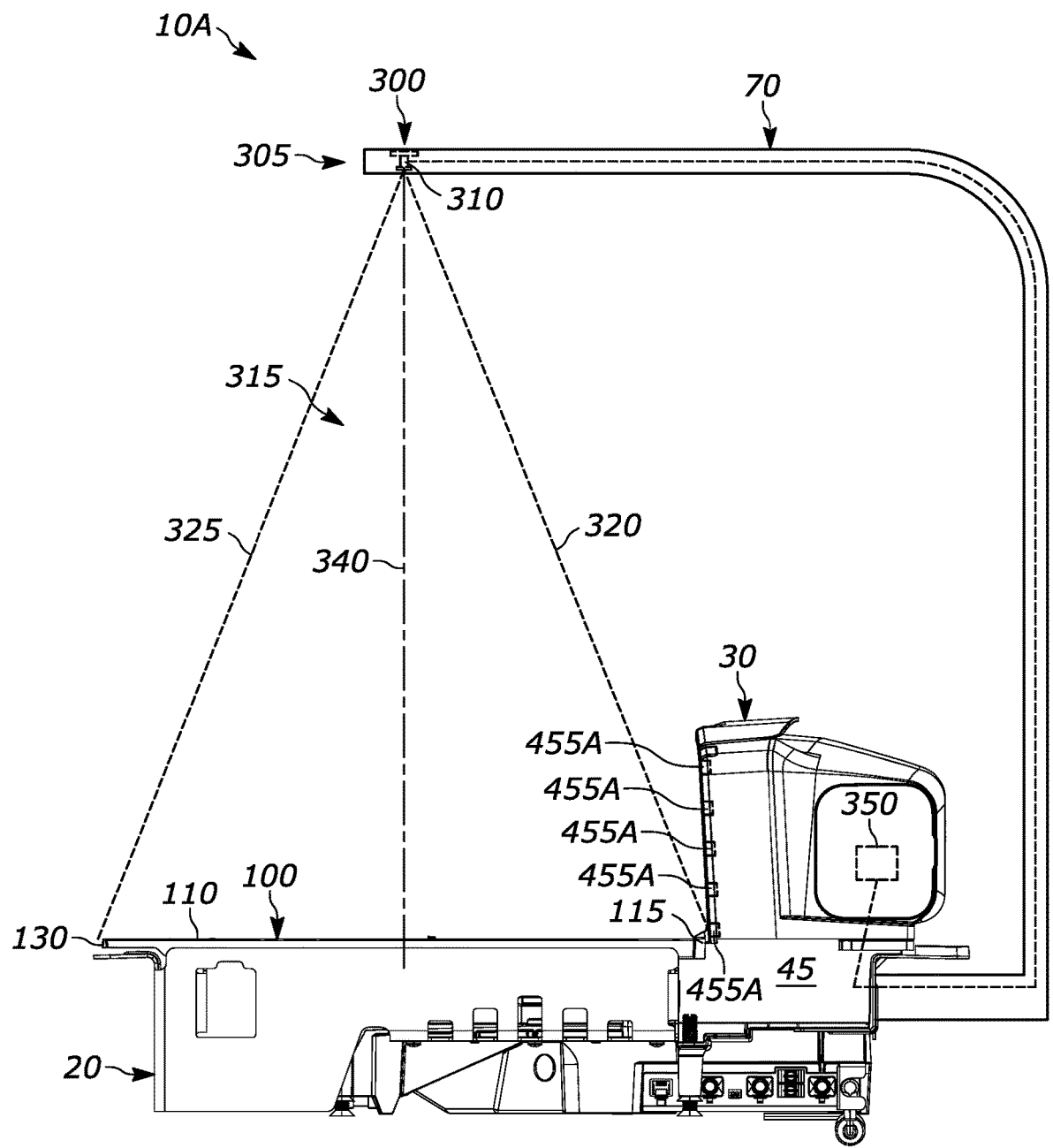
FIG. 7 illustrates a side view of the barcode reader of FIG. 3 with another example off-platter detection assembly.
Figure 8:
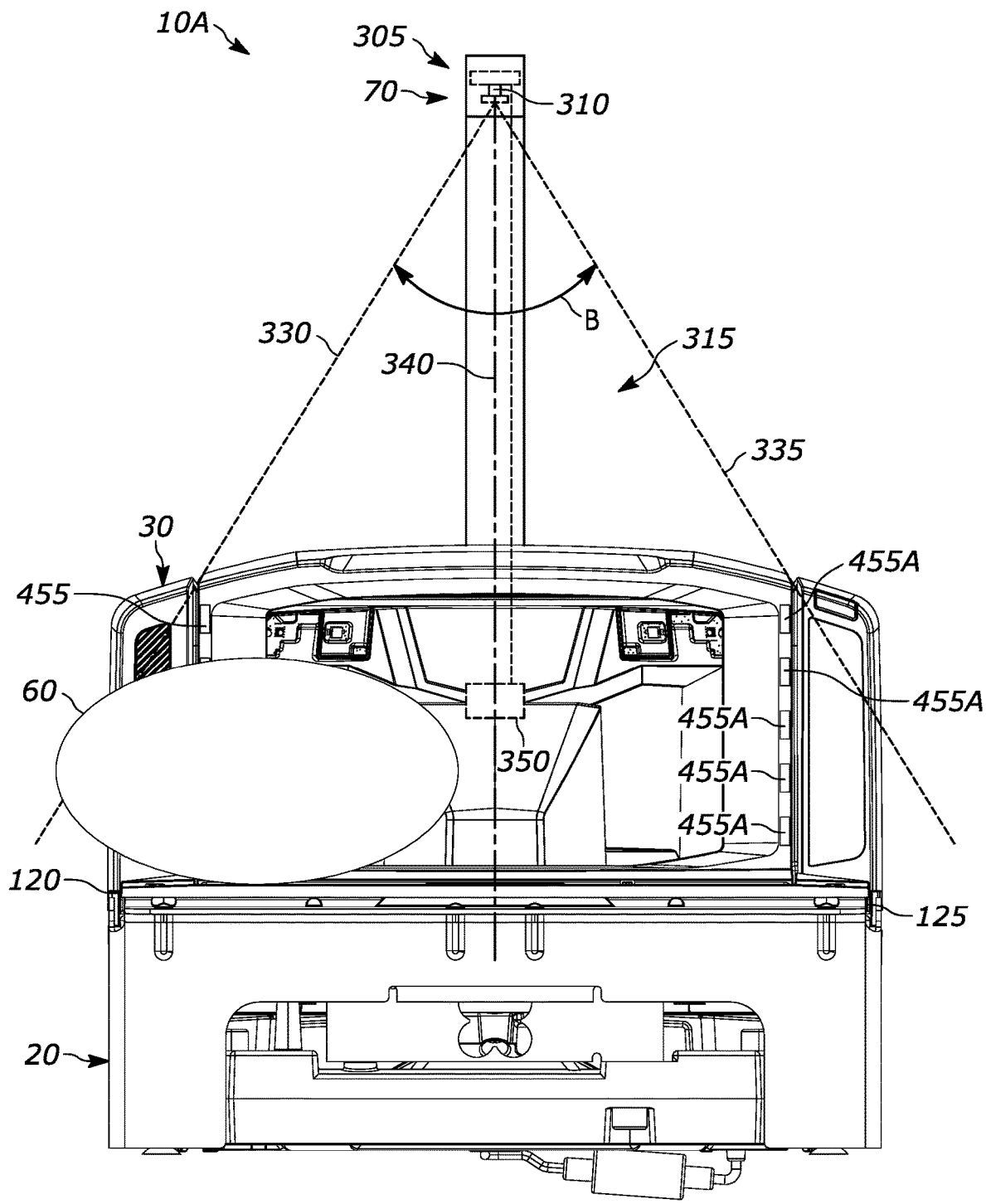
FIG. 8 illustrates a front view of the barcode reader of FIG. 7 with an object extending across a first lateral edge of the weigh platter.

FIGS. 7-8 illustrate barcode reader 10A with off-platter indication system 450 and one particular example of an off-platter detection assembly 300, which in the example shown is a camera based system. In this example, off-platter detection assembly 300 generally includes an overhead imaging assembly 305 and controller 350 operatively coupled to overhead imaging assembly 305, which is positioned substantially above weigh platter 105 and looks down on weigh platter 105. Positioning overhead imaging assembly 305 above and looking down on weigh platter 105 locates overhead imaging assembly 305 far enough above tall items being weighted so as to reduce the chance that a tall object would falsely trigger off-platter detection assembly 300. Overhead imaging assembly 305 can be an imaging assembly that is dedicated to off-platter detection assembly 300 or an imaging assembly that is already part of barcode reader 10 and used for object recognition and is positioned above and looking down on weigh platter 105. Overhead imaging assembly 305 includes an imager 310, preferably a 2 mega pixel camera, that has a field-of-view 315 that extends downward towards upper surface 110 of weigh platter 105 and is configured to capture an image of upper surface 110 of weigh platter 105 with object 60 located on weigh platter 105, including first lateral edge 120 and second lateral edge 125, within field-of-view 315. Field-of-view 315 has a proximal boundary 320, a distal boundary 325, opposite proximal boundary 320, a first lateral boundary 330, and a second lateral boundary 335, opposite first lateral boundary 330. To provide the maximum amount of lateral coverage of upper surface 110, field-of-view 315 preferably has a transverse field-of-view angle B between first lateral boundary 330 and second lateral boundary 335 that is within the range of 100 degrees and 135 degrees.

In the example shown, barcode reader 10A includes a gooseneck post 70 that extends from a back of housing 15 and extends over weigh platter 105 and overhead imaging assembly 305 is positioned within gooseneck post 70 such that a central axis 340 of field-of-view 315 extends generally perpendicular to upper surface 110 of weigh platter 105. Alternatively, rather than being positioned within gooseneck post 70, overhead imaging assembly 305 could be mounted or positioned in any position above and looking down on weigh platter 105, such as in a ceiling or as part of an overhead object recognition system or security system overlooking weigh platter 105. To provide the maximum amount of longitudinal coverage of upper surface 110, overhead imaging assembly 305 can be positioned such that proximal boundary 320 of field-of-view 315 intersects upper surface 110 of weigh platter 105 at or substantially adjacent proximal edge 115 (e.g., within the range of 0-30 mm of proximal edge 115) and distal boundary 325 extends to or beyond distal edge 130.

Controller 350 can be calibrated initially (at the factory or during installation or final testing) by being configured to identify and locate first lateral edge 120 and second lateral edge 125 based on a training image of upper surface 110 of weigh platter 105 within field-of-view 315. The training image is an image of upper surface 110 of weigh platter 105 without an object placed on weigh platter 105 and first lateral edge 120 and second lateral edge 125 within field-of-view 315. For example, the location of the first and second lateral edges 120, 125 can be identified by a user observing the training image by drawing or indicating lies on the training image using a configuration tool or the first and second lateral edges 120, 125 could be detected automatically by controller 350.

In addition to controlling the illumination and de-illumination of light sources 455, controller 350 is also configured to receive an image from imager 310 and determine if an object 60 (FIG. 8) positioned on weigh platter 105 extends over first or second lateral edges 120, 125 and, if so, determine the location of object 60 along first lateral or second lateral edge 120, 125 based on the image. Controller 350 can be configured to determine if and where object 60 extends over first or second lateral edges 120, 125 by determining if part of the first or second lateral edges 120, 125 or the gap between weigh platter 105 and lower housing 20 or workstation 50, determined during calibration based on the training image, is blocked or not visible. Controller 350 can also use a convolutional neural network (CNN) to determine whether object 60 extends over first or second lateral edges 120, 125, for example, by identifying object 60 and its orientation and comparing it against a database of dimensional data to determine whether object 60 crosses first or second lateral edges 120, 125. If controller 350 determines that object 60 does not extend over either first or second lateral edges 120, 125, controller 350 can be configured to allow the measured weight of object 60 to be recorded. If controller 350 determines that object 60 does extend over first lateral edge 120 and/or second lateral edge 125, in addition to the illumination and de-illumination of light sources 455 as described above, controller 350 can be configured to prevent the measured weight of object 60 from being recorded.

Figure 9:
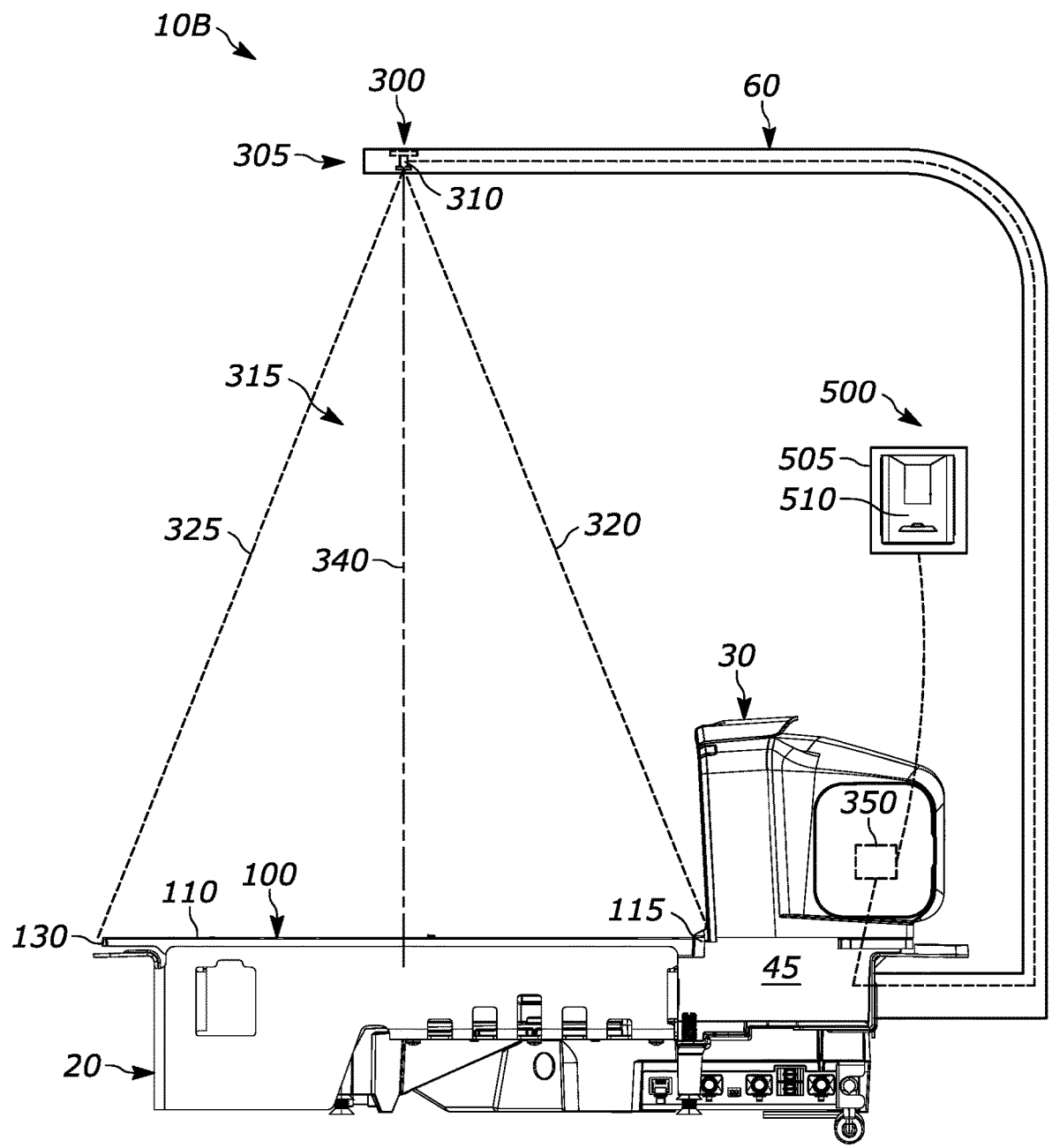
FIG. 9 illustrates a side view of a third example barcode reader having an off-platter detection assembly with a third example off-platter indication system.
Figure 10:
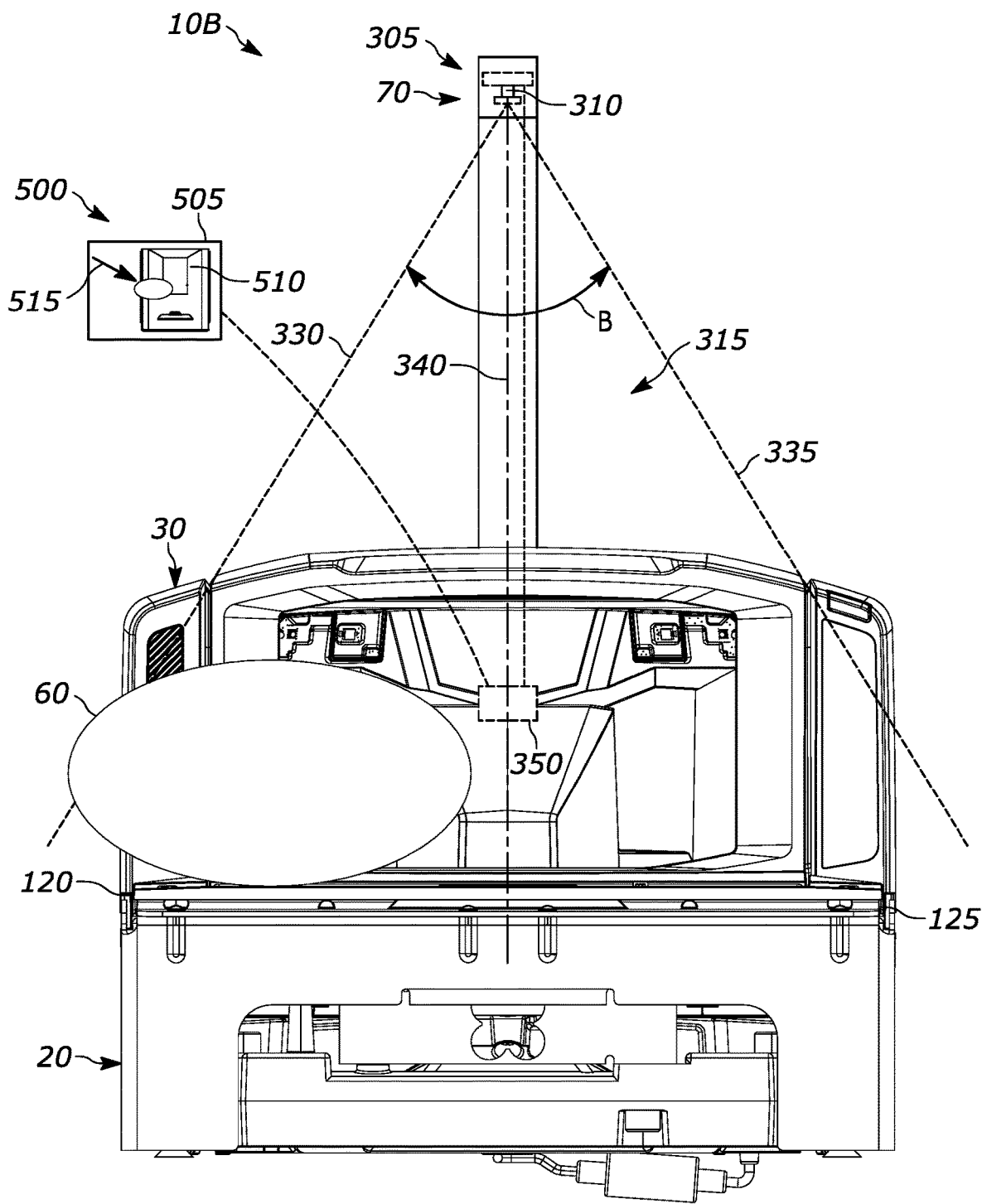
FIG. 10 illustrates a front view of the barcode reader of FIG. 9 with an object extending across a first lateral edge of the weigh platter.

Referring to FIGS. 9-10, a third example barcode reader 10B is illustrated that is the same as barcode reader 10A with off-platter detection assembly 300 described above and shown in FIGS. 7-8, but includes a third example off-platter indication system 500, rather than off-platter indication system 450. In barcode reader 10B, off-platter indication system 500 is in communication with controller 350 and has a visual display 505, which could be a display of barcode reader 10B, a display or monitor that is separate from and in communication with barcode reader 10B, or a display of a point-of-sale system operatively coupled to barcode reader 10B. In this example, if controller 350 determines that object 60 does extend over first lateral edge 120 and/or second lateral edge 125, rather than controlling the illumination and de-illumination of light sources 455, controller 350 can be configured to display a platter representation 510 on visual display 505 with an indication 515 of the location where object 60 extends over first and/or second lateral edges 120, 125. Platter representation 510 can be a live video feed that controller 350 receives from overhead imaging assembly 305, a photographic representation of weigh platter 105, or a drawing or rendering of weigh platter 105. As shown, indication 515 is an arrow that points to the location that object 60 extends across first and/or second lateral edges 120, 125, but indication 515 could be any indicator that would communicate to the user the location, such as highlighting a portion of weigh platter 105 where the off-platter event is occurring. In addition to providing the an alert to a user on visual display 505, controller 350 can also be configured to allow the measure weight of object 60 to be recorded if controller 350 determines that object 60 does not extend over either first or second lateral edges 120, 125 and prevent the measured weight of object from being recorded if controller 350 determines that object 60 does extend over either first or second lateral edges 120, 125.

Furthermore, since field-of-view 315 of overhead imaging assembly 305 encompasses the entire weigh platter 105, including distal edge 130, in addition to determining if object 60 extends over first or second lateral edges 120, 125, controller 350 can be configured to determine if object 60 extends over distal edge 130 based on the image and, if so, determine a location where object 60 extends over distal edge 130. If controller 350 determines that object 60 extends over distal edge 130, off-platter indication system 500 can display platter representation 510 on visual display 505 with indication 515 of the location where object 60 extends over distal edge 130 displayed in platter representation 510. In addition to providing the an alert to a user on visual display 505, controller 350 can also be configured to allow the measure weight of object 60 to be recorded if controller 350 determines that object 60 does not extend over distal edge 130 and prevent the measured weight of object from being recorded if controller 350 determines that object 60 does extend over distal edge 130.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A barcode reader configured to be supported by a workstation, the barcode reader comprising:
   a housing having a lower housing and an upper housing extending above the lower housing;
   a weigh platter positioned within the lower housing and configured to measure a weight of an object placed on the weigh platter, the weigh platter having an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge; and
   an off-platter detection assembly comprising:
   an off-platter indication system having a plurality of linearly aligned light sources, each of the plurality of light sources representing a location along the first lateral edge of the weigh platter; and
   controller operatively coupled to the plurality of light sources, the controller configured to:
   determine if an object extends over the first lateral edge of the weigh platter;
   determine a location of the object along the first lateral edge if determined that the object extends over the first lateral edge; and
   illuminate a first portion of the plurality of light sources representing a distance between the proximal edge of the weigh platter and the determined location of the object and de-illuminate a second portion of the plurality of light sources representing a distance between the determined location of the object and the distal edge of the weigh platter if determined that the object extends over the first lateral edge.

2. The barcode reader of claim 1, wherein the plurality of light sources are positioned in the upper housing, are generally aligned with the first lateral edge of the weigh platter, and are directed towards the distal edge of the weigh platter to be visible by a user.

3. The barcode reader of claim 1, wherein the plurality of light sources are positioned in the upper surface of the weigh platter and are generally aligned with the first lateral edge of the weigh platter.

4. The barcode reader of claim 1, wherein the off-platter detection assembly comprises:
   a light emission assembly operatively coupled to the controller and configured to emit one or more pulses of light away from the proximal edge and along the first lateral edge of the weigh platter; and
   a light detection assembly operatively coupled to the controller and having a field-of-view extending from the proximal edge to at least the distal edge and along the first lateral edge and having a light sensor configured to detect at least a portion of the one or more pulses of light reflected towards the proximal edge within the field-of-view, the field-of-view having a central field-of-view axis parallel relative to the lateral edge;
   wherein the controller is configured to:
   measure a time-of-flight (TOF) of reflected light, the TOF of reflected light comprising the time the one or more pulses of light are emitted by the light emission assembly to the time the at least a portion of the one or more pulses of light are reflected back to the light detection assembly and detected by the light sensor;
   determined if the object extends over the first lateral edge of the weigh platter and the location of the object along the first lateral edge based on a measured TOF;
   allow the measured weight to be recorded in response to the measured TOF being equal to or greater than a predetermined TOF; and
   prevent the measured weight from being recorded in response to the measured TOF being less than the predetermined TOF.

5. The barcode reader of claim 4, wherein the predetermined TOF is a time the one or more pulses of light are emitted by the light emission assembly to a time at least a portion of the one or more pulses of light are reflected back to the light detection assembly from an object located at the distal edge and detected by the light sensor.

6. The barcode reader of claim 4, wherein the central field-of-view axis is substantially adjacent the first lateral edge.

7. The barcode reader of claim 4, comprising an aperture positioned in front of the light sensor to constrain a field-of-view of the light sensor, wherein the center of the aperture is coaxial with a central field-of-view axis of the light sensor.

8. The barcode reader of claim 7, further comprising a lens positioned in front of the aperture and configured to focus the portion of the reflected pulse of light onto the light sensor.

9. The barcode reader of claim 4, comprising an aperture that constrains a field-of-view of the one or more pulses of light.

10. The barcode reader of claim 9, further comprising a lens positioned in front of the aperture and configured to focus the one or more pulses of light.

11. The barcode reader of claim 1, wherein the off-platter detection assembly comprises:
    an overhead imaging assembly operatively coupled to the controller and positioned above the weigh platter and including an imager having a field-of-view extending downward towards the upper surface of the weigh platter, the field-of-view having a central axis that extends perpendicular to the upper surface, the imager configured to capture an image of the upper surface of the weigh platter with an object located on the weigh platter, including the first lateral edge and the second lateral edge, within the field-of-view;
    wherein the controller is configured to:
    identify and locate the first lateral edge based upon a training image of the upper surface of the weigh platter within the field-of-view, the training image comprising an image of the weigh platter without an object and the first lateral edge within the field-of-view;
    receive the image from the imager;

determine if the object extends over the first lateral edge and the location of the object along the first lateral edge based on the image;

allow the measured weight to be recorded in response to the controller determining that the object does not extend over the first lateral edge based on the image; and prevent the measured weight from being recorded in response to the controller determining that the object does extend over the first lateral edge based on the image.

12. The barcode reader of claim 11, wherein a proximal boundary of the field-of-view intersects the upper surface of the weigh platter at or substantially adjacent to the proximal edge.

13. The barcode reader of claim 11, wherein the field-of-view comprises a transverse field-of-view angle within the range of 100 degrees and 135 degrees.

14. The barcode reader of claim 11, wherein the barcode reader comprises a gooseneck post that extends from a back of the housing and extends over the weigh platter and the imaging assembly is positioned within the gooseneck post.

15. A barcode reader configured to be supported by a workstation, the barcode reader comprising:
a housing having a lower housing and an upper housing extending above the lower housing;
a weigh platter positioned within the lower housing and configured to measure a weight of an object placed on the weigh platter, the weigh platter having an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge; and
an off-platter detection assembly comprising:
an overhead imaging assembly positioned above the weigh platter and including an imager having a field-of-view extending downward towards the upper surface of the weigh platter, the field-of-view having a central axis that extends perpendicular to the upper surface, the imager configured to capture an image of the upper surface of the weigh platter with an object positioned on the weigh platter, including the first lateral edge, the second lateral edge, and the distal edge within the field-of-view;
an off-platter indication system having a visual display; and
a controller in communication with the overhead imaging assembly and the off-platter indication system, the controller configured to:
identify and locate the first and second lateral edges based upon a training image of the upper surface of the weigh platter within the field-of-view, the training image comprising an image of the weigh platter without an object and the first and second lateral edges within the field-of-view;
receive the image from the imager;
determine if the object extends over the first and/or second lateral edges based on the image;
determine a location where the object extends over the first and/or second lateral edges if determined that the object extends over the first and/or second lateral edges; and
display a platter representation with an indication of the location where the object extends over the first and/or second lateral edges displayed in the platter representation on the visual display in response to the controller determining that the object does extend over the first and/or second lateral edges based on the image.

16. The barcode reader of claim 15, wherein the controller is configured to:
allow the measured weight to be recorded in response to the controller determining that the object does not extend over the first or second lateral edges based on the image; and
prevent the measured weight from being recorded in response to the controller determining that the object does extend over the first or second lateral edges based on the image.

17. The barcode reader of claim 15, wherein the platter representation is one of a live video feed received from the overhead imaging assembly, a photographic representation of the weigh platter, or a rendering of the weigh platter.

18. The barcode reader of claim 15, wherein the controller is configured to determine if the object extends over the distal edge based on the image, determine a location where the object extends over the distal edge, and display the platter representation with an indication of the location where the object extends over the distal edge displayed in the platter representation on the visual display in response to the controller determining that the object does extend over the distal edge based on the image.

19. The barcode reader of claim 18, wherein the controller is configured to:
allow the measured weight to be recorded in response to the controller determining that the object does not extend over the distal based on the image; and
prevent the measured weight from being recorded in response to the controller determining that the object does extend over the distal edge based on the image.

20. The barcode reader of claim 18, wherein the platter representation is one of a live video feed received from the overhead imaging assembly, a photographic representation of the weigh platter, or a rendering of the weigh platter.

21. The barcode reader of claim 15, wherein the visual display is a display of a point-of-sale system operatively coupled to the barcode reader.

22. The barcode reader of claim 15, wherein a proximal boundary of the field-of-view intersects the upper surface of the weigh platter at or substantially adjacent to the proximal edge.

23. The barcode reader of claim 15, wherein the field-of-view comprises a transverse field-of-view angle within the range of 100 degrees and 135 degrees.

24. The barcode reader of claim 15, wherein the barcode reader comprises a gooseneck post that extends from a back of the housing and extends over the weigh platter and the imaging assembly is positioned within the gooseneck post.

* * * * *